United States Patent
Hiroike et al.

(10) Patent No.: US 11,863,723 B2
(45) Date of Patent: Jan. 2, 2024

(54) DOCUMENT DETERMINATION SYSTEM AND PRINTING DEVICE FOR DETERMINING NORMALITY OF DOCUMENT IMAGE BASED ON CODE IMAGE

(71) Applicant: SEIKO EPSON CORPORATION, Tokyo (JP)

(72) Inventors: Go Hiroike, Matsumoto (JP); Yoichiro Maki, Shiojiri (JP); Shin Miura, Shiojiri (JP); Masayuki Nagase, Shiojiri (JP); Shinji Takio, Shiojiri (JP); Hiroyuki Kuramoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/807,117

(22) Filed: Jun. 15, 2022

(65) Prior Publication Data
US 2022/0407977 A1    Dec. 22, 2022

(30) Foreign Application Priority Data
Jun. 18, 2021 (JP) ................. 2021-101396

(51) Int. Cl.
*H04N 1/32* (2006.01)
*H04N 1/00* (2006.01)

(52) U.S. Cl.
CPC ..... *H04N 1/32133* (2013.01); *H04N 1/00816* (2013.01); *H04N 1/00846* (2013.01); *H04N 1/00864* (2013.01); *H04N 2201/3269* (2013.01)

(58) Field of Classification Search
None
See application file for complete search history.

(56) References Cited

U.S. PATENT DOCUMENTS

| | | | | |
|---|---|---|---|---|
| 6,563,598 B1* | 5/2003 | Johnson | ............ | H04N 1/00968 358/1.15 |
| 7,880,922 B2* | 2/2011 | Onishi | ............... | G03G 15/5062 358/510 |
| 7,898,685 B2* | 3/2011 | Onishi | ............... | G06F 3/03545 382/209 |
| 8,191,765 B2* | 6/2012 | Matsumura | ........ | H04N 1/00846 235/487 |

(Continued)

FOREIGN PATENT DOCUMENTS

| | | | | |
|---|---|---|---|---|
| CN | 101807365 A | * | 8/2010 | |
| JP | 06070134 A | * | 3/1994 | ......... H04N 1/00867 |
| JP | 2008-016934 | | 1/2008 | |

*Primary Examiner* — Scott A Rogers
(74) *Attorney, Agent, or Firm* — WORKMAN NYDEGGER

(57) ABSTRACT

A document determination system includes a server device that stores identification information in association with document information, a printer that prints a document image corresponding to the document information and a code image indicating the identification information on a print medium to generate a normal printed matter, and a scanner that reads a print image printed on a printed matter including the normal printed matter and a copied printed matter obtained by copying the normal printed matter. The printer prints the code image in a preset end region of the print medium. The server device determines whether the printed matter is the normal printed matter based on the code image included in the print image read by the scanner.

8 Claims, 10 Drawing Sheets

(56) References Cited

U.S. PATENT DOCUMENTS

| | | | | |
|---|---|---|---|---|
| 8,316,425 B2* | 11/2012 | Cattrone | ............ | H04N 1/32101 726/7 |
| 10,303,096 B1* | 5/2019 | Kawaguchi | .......... | G03G 15/205 |
| 10,432,803 B2* | 10/2019 | Hakamada | ......... | H04N 1/00877 |
| 10,455,120 B2* | 10/2019 | Mizuno | ................ | H04N 1/4433 |
| 2006/0285168 A1* | 12/2006 | Horino | .................. | H04N 1/387 358/1.15 |
| 2009/0268259 A1 | 10/2009 | Kikuchi | | |
| 2011/0128566 A1* | 6/2011 | Eum | ................. | H04N 1/00872 358/1.14 |
| 2015/0222783 A1* | 8/2015 | Choi | ................. | H04N 1/00342 235/375 |
| 2021/0227087 A1* | 7/2021 | Ozaki | ................ | H04N 1/00854 |

* cited by examiner

FIG. 3
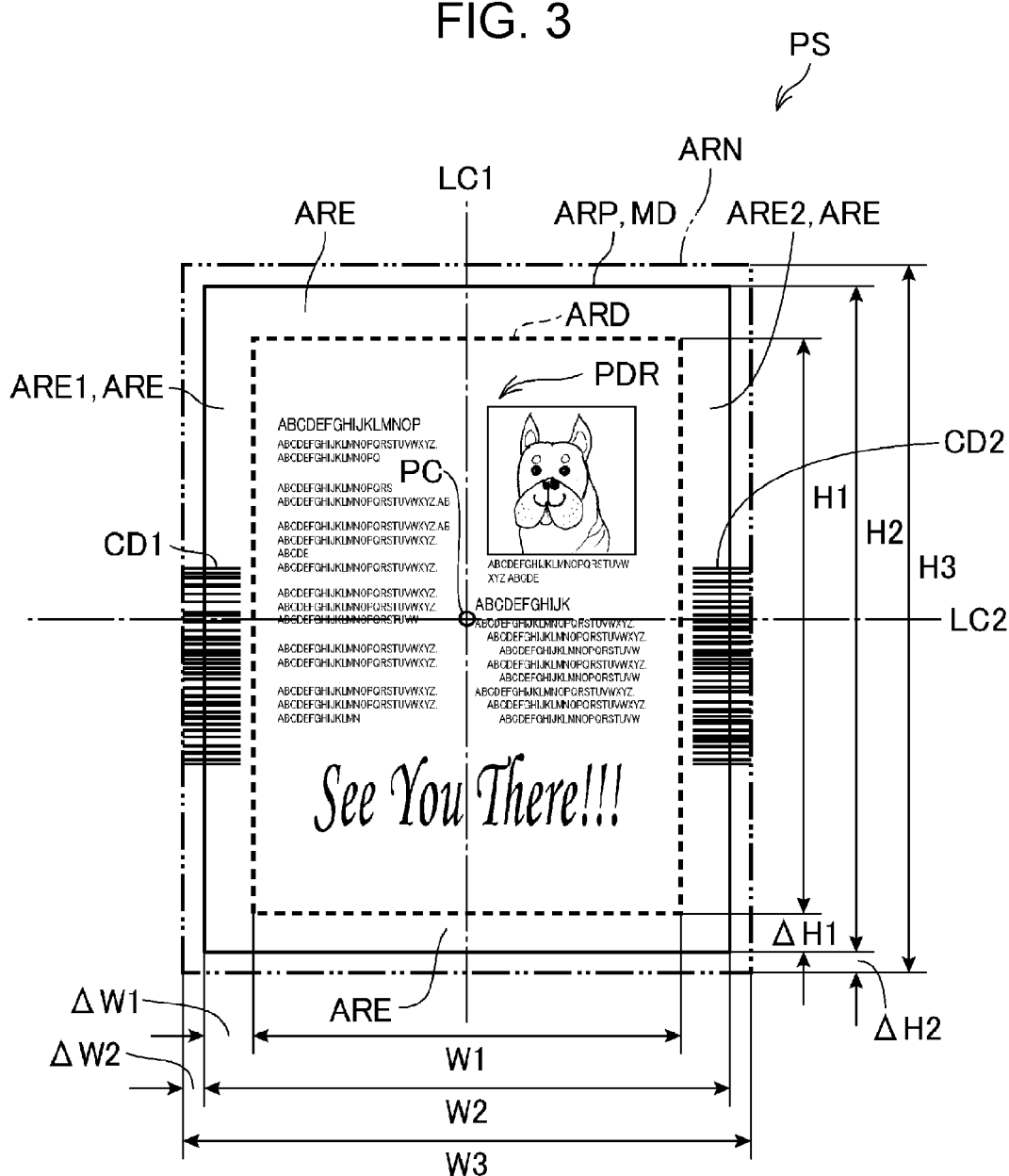
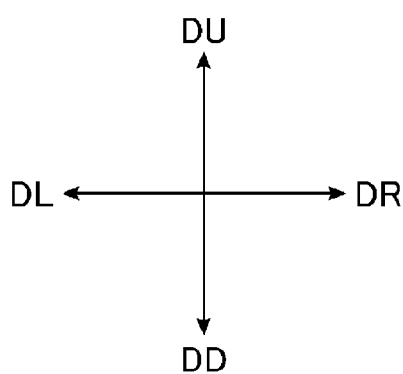

FIG. 5
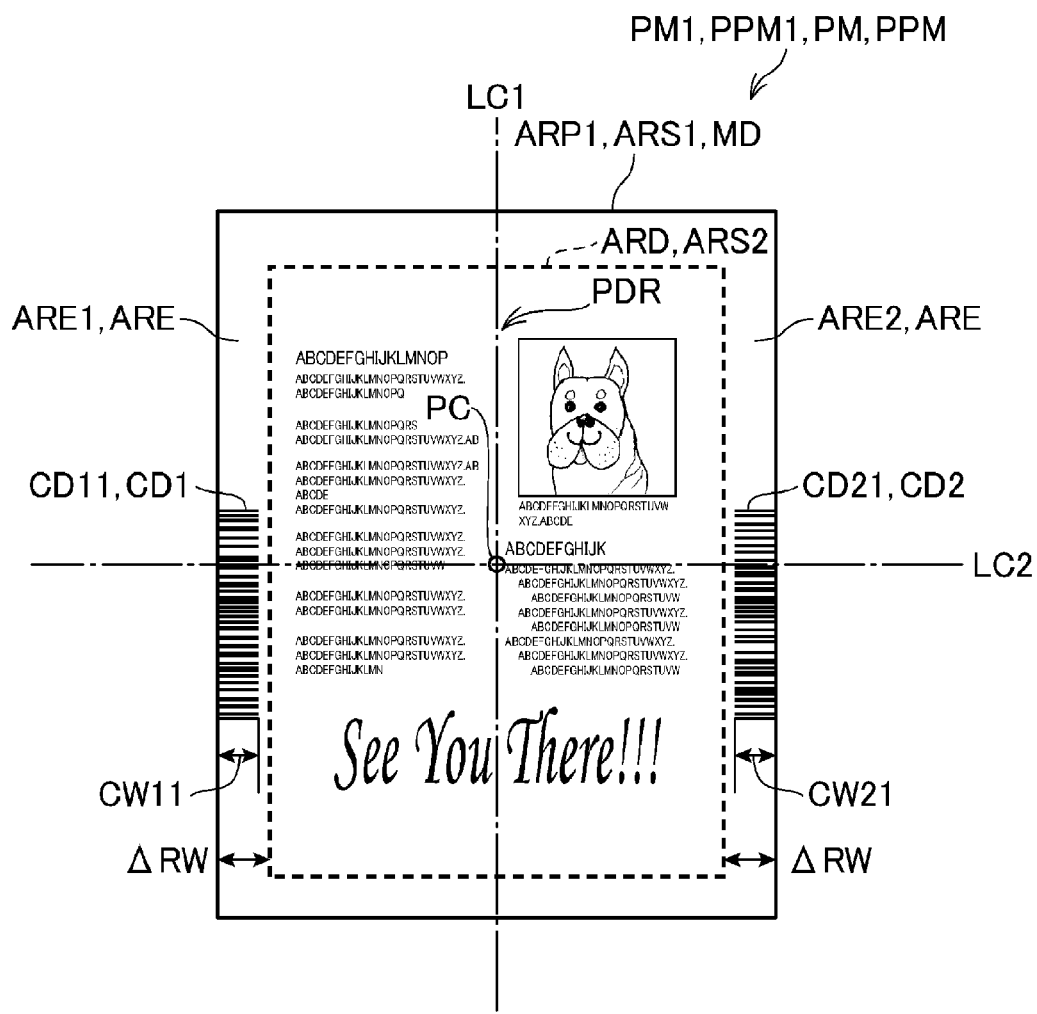
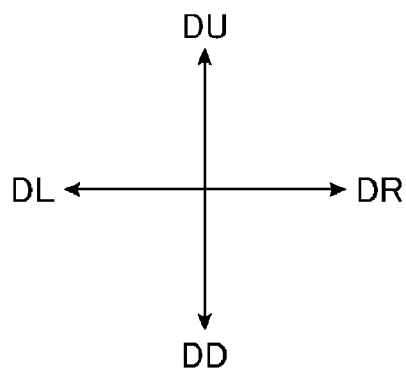

FIG. 6
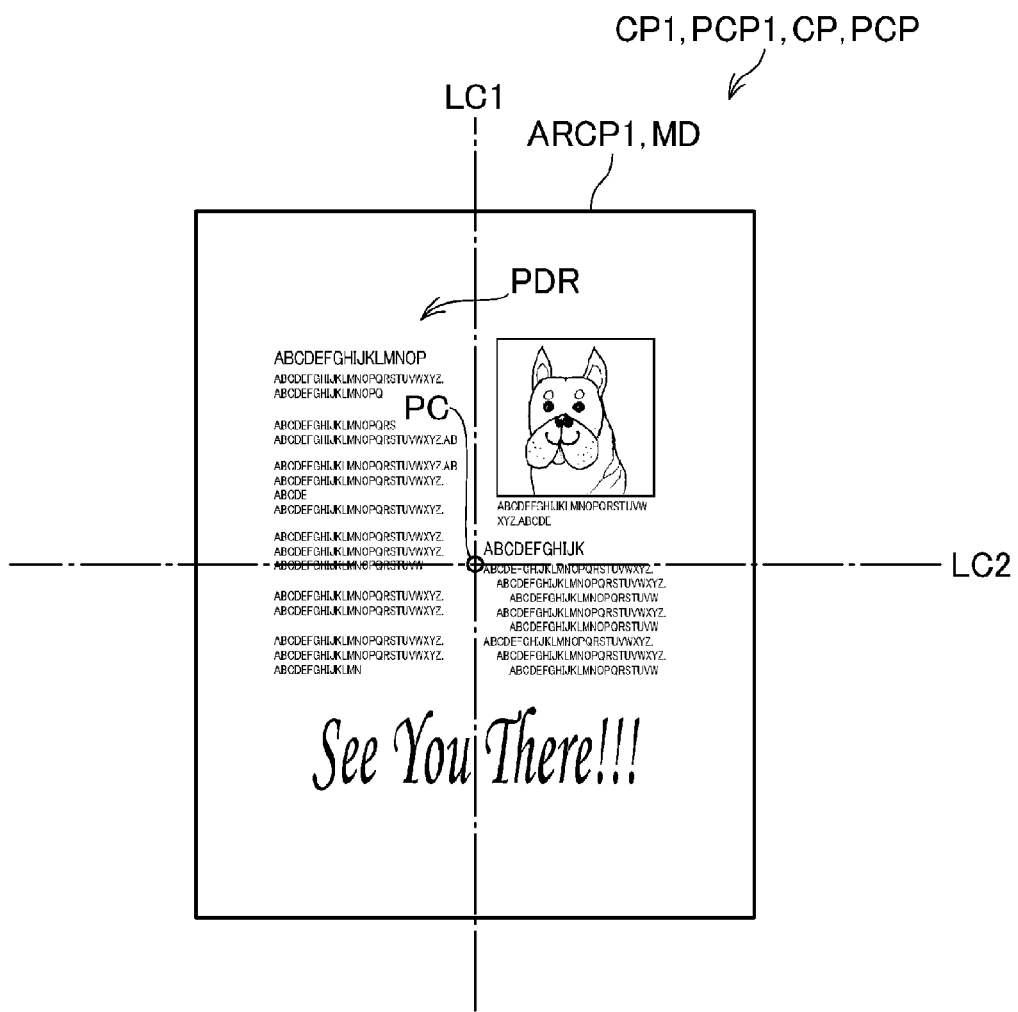
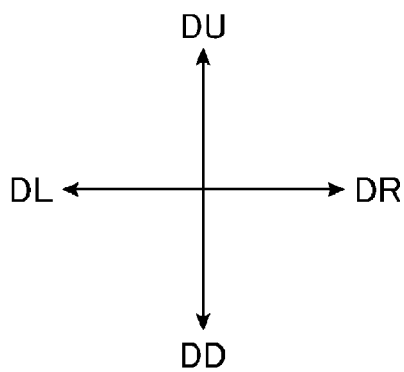

FIG. 8
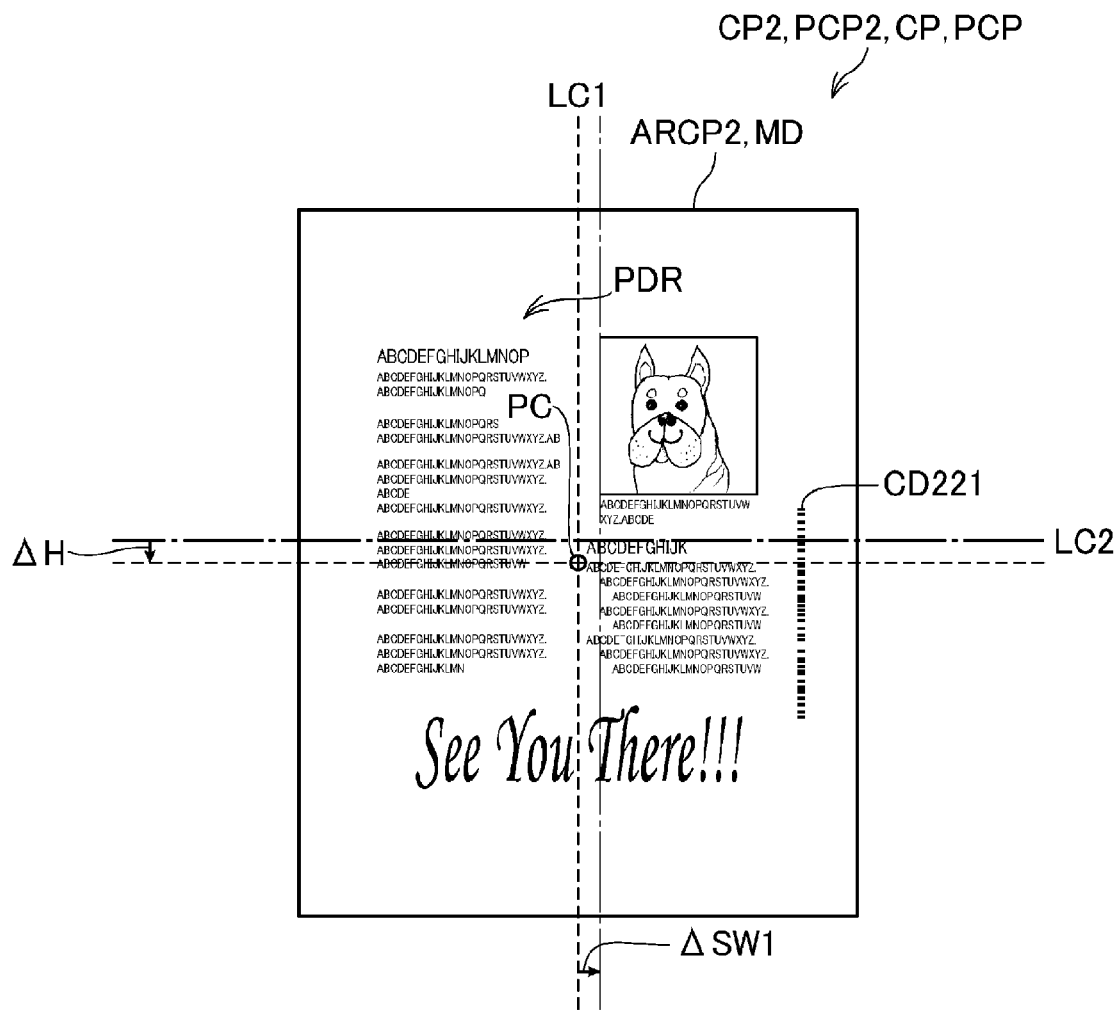
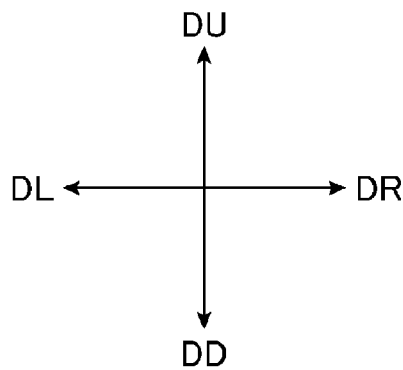

DOCUMENT DETERMINATION SYSTEM AND PRINTING DEVICE FOR DETERMINING NORMALITY OF DOCUMENT IMAGE BASED ON CODE IMAGE

The present application is based on, and claims priority from JP Application Serial Number 2021-101396, filed Jun. 18, 2021, the disclosure of which is hereby incorporated by reference herein in its entirety.

BACKGROUND

1. Technical Field

The present disclosure relates to a document determination system and a printing device.

2. Related Art

A technique for identifying a copy and an authentic document is known.

JP-A-2008-16934 describes a technique that enables the authenticity of a document to be checked by embedding, as a pattern, a hash value generated from print data and performing printing.

It is required to identify a copy and an authentic document with a simpler configuration than the technique described in JP-A-2008-16934 and the like.

SUMMARY

To solve the above-described problem, according to an aspect, a document determination system includes an information processing device that stores identification information in association with document information; a printing device that prints a document image corresponding to the document information and a code image indicating the identification information on a print medium to generate a normal printed matter; and a reading device that reads a print image printed on a printed matter including the normal printed matter and a copied printed matter obtained by copying the normal printed matter. The printing device prints the code image in a preset end region of the print medium. The information processing device determines whether the printed matter is the normal printed matter based on the code image included in the print image read by the reading device.

To solve the above-described problem, according to another aspect, a printing device acquires, from an information processing device, document information and a code image indicating identification information associated with the document information, and prints a document image corresponding to the document information and the code image on a print medium to generate a printed matter. The printing device prints the code image in a preset end region of the print medium.

BRIEF DESCRIPTION OF THE DRAWINGS

FIG. 3 is a diagram illustrating an example of a frameless print region and a normal print region.

FIG. 5 is a diagram illustrating an example of a normal printed matter.

FIG. 6 is a diagram illustrating an example of a copied printed matter.

FIG. 8 is a diagram illustrating another example of the copied printed matter.

DESCRIPTION OF EXEMPLARY EMBODIMENTS

Hereinafter, an embodiment is described with reference to the drawings.

Figure 1:
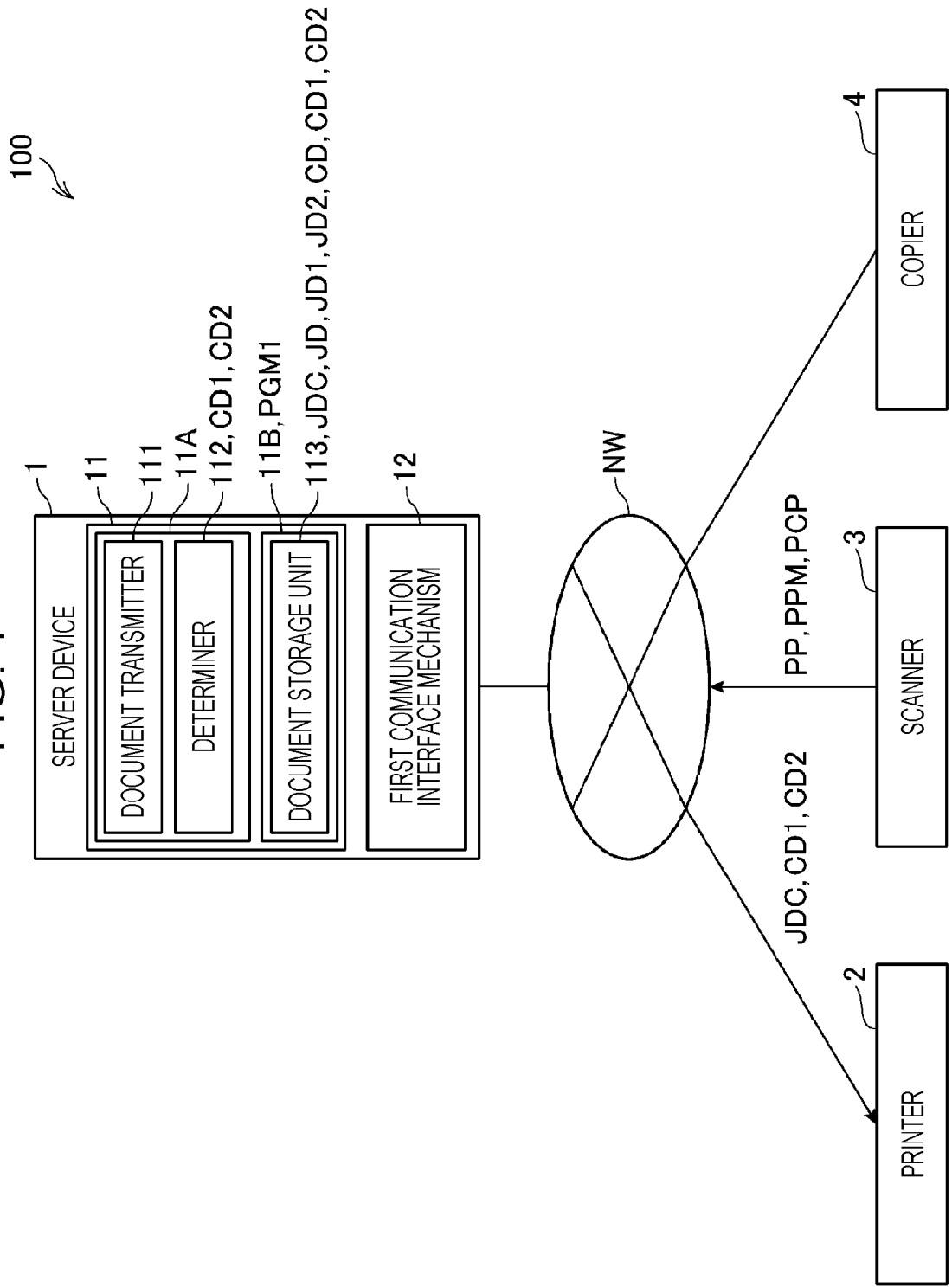
FIG. 1 is a diagram illustrating an example of a configuration of a document determination system.

FIG. 1 is a diagram illustrating an example of a configuration of a document determination system 100. First, the configuration of the document determination system 100 is described with reference to FIG. 1.

The document determination system 100 includes a server device 1, a printer 2, a scanner 3, and a copier 4.

Each of the printer 2, the scanner 3, and the copier 4 is communicably connected to the server device 1 via a network NW. For example, each of the printer 2, the scanner 3, and the copier 4 is communicably connected to the server device 1 according to an Ethernet (registered trademark) standard.

The network NW is, for example, the Internet.

Although the embodiment describes a case where the network NW is the Internet, the network NW is not limited thereto. The network NW may be a local area network (LAN) or may be a wide area network (WAN).

In the embodiment, each of the printer 2, the scanner 3, and the copier 4 is communicably connected to the server device 1 according to the Ethernet (registered trademark) standard, but is not limited thereto. Each of the printer 2, the scanner 3, and the copier 4 may be communicably connected to the server device 1 via wireless communication such as Wi-Fi (registered trademark).

In addition, in the embodiment, the copier 4 is communicably connected to the server device 1, but is not limited thereto. The copier 4 may not be connected to the server device 1.

The server device 1 transmits document information JDC and a code image CD indicating identification information JD to the printer 2 according to a request from the printer 2. In the embodiment, the code image CD includes a first code image CD1 and a second code image CD2.

The server device 1 corresponds to an example of an "information processing device".

The printer 2 acquires the document information JDC, the first code image CD1, and the second code image CD2 from the server device 1. The printer 2 positions the first code image CD1 and the second code image CD2 in an end region ARE of a print medium MD such as print paper. Then, the printer 2 prints a document image PDR corresponding to the document information JDC, the first code image CD1, and the second code image CD2 on the print medium MD to generate a normal printed matter PM.

The printer 2 is further described with reference to FIG. 2.

The end region ARE is further described with reference to FIG. 3.

The normal printed matter PM is further described with reference to FIGS. 5 and 7.

The printer 2 corresponds to an example of a "printing device".

The copier 4 copies the normal printed matter PM to generate a copied printed matter CP. Specifically, the copier 4 reads the images formed on the normal printed matter PM and prints the read images on the print medium MD to generate the copied printed matter CP.

The copied printed matter CP is further described with reference to FIGS. 6 and 8.

The copier 4 corresponds to an example of a "copying device".

The scanner 3 reads a print image PP printed on a printed matter P including the normal printed matter PM and the copied printed matter CP. The print image PP printed on the normal printed matter PM is referred to as a normal image PPM. The print image PP printed on the copied printed matter CP is referred to as a copy image PCP. Then, the scanner 3 transmits the print image PP to the server device 1.

The normal image PPM is further described with reference to FIGS. 5 and 7.

The copy image PCP is further described with reference to FIGS. 6 and 8.

The scanner 3 corresponds to an example of a "reading device".

The server device 1 receives the print image PP from the scanner 3 and determines whether the print image PP corresponds to the normal printed matter PM or the copied printed matter CP. Then, the server device 1 transmits the determination result to the scanner 3.

Next, the configuration of the server device 1 is described with reference to FIG. 1.

The server device 1 includes a first controller 11 and a first communication interface mechanism 12. The first controller 11 controls an operation of each unit of the server device 1. The first controller 11 includes a first processor 11A and a first memory 11B.

The first communication interface mechanism 12 communicates with each of the printer 2, the scanner 3, and the copier 4 via wired communication according to the Ethernet (registered trademark) standard in accordance with an instruction from the first controller 11.

The first communication interface mechanism 12 includes a connector to be connected to an Ethernet (registered trademark) cable, and an interface circuit that processes a signal to be transmitted to the connector. The first communication interface mechanism 12 is an interface substrate having the connector and the interface circuit and is connected to a main substrate on which the first processor 11A of the first controller 11 and the like are implemented. Alternatively, the connector and the interface circuit that constitute the first communication interface mechanism 12 are implemented on the main substrate of the first controller 11.

The first controller 11 is a controller that includes the first processor 11A and the first memory 11B.

The first memory 11B is a storage device that stores, in a nonvolatile manner, data and a program to be executed by the first processor 11A. The first memory 11B is constituted by a magnetic storage device such as a hard disk drive (HDD), a semiconductor storage device such as a solid-state drive (SSD), a semiconductor storage element such as a flash read-only memory (ROM), or another type of nonvolatile storage device. The first memory 11B may include a random-access memory (RAM) constituting a work area of the first processor 11A. The first memory 11B stores data to be processed by the first controller 11 and a first control program PGM1 to be executed by the first processor 11A.

The first processor 11A may be constituted by a single processor, or a plurality of processors may function as the first processor 11A. The first processor 11A executes the first control program PGM1 to control each unit of the server device 1.

In the embodiment, the first processor 11A executes the first control program PGM1 to control each unit of the server device 1, but the first controller 11 may be an application-specific integrated circuit (ASIC). The ASIC may execute processing by an implemented function. The first controller 11 may be a signal processing circuit. The signal processing circuit may execute signal processing to execute the processing.

The first controller 11 includes a document transmitter 111, a determiner 112, and a document storage unit 113 as functional blocks.

Specifically, the first processor 11A functions as the document transmitter 111 and the determiner 112 by executing the first control program PGM1. The first processor 11A causes the first memory 11B to function as the document storage unit 113 by executing the first control program PGM1.

The document storage unit 113 stores the identification information JD in association with the document information JDC. The identification information JD is information identifying the document information JDC. The identification information JD is, for example, a hash value corresponding to the document information JDC.

In the embodiment, the identification information JD includes first identification information JD1 and second identification information JD2.

In addition, the document storage unit 113 stores the code image CD in association with the document information JDC.

In the embodiment, the code image CD includes the first code image CD1 and the second code image CD2. The first code image CD1 corresponds to the first identification information JD1. The first code image CD1 is, for example, a one-dimensional barcode image indicating the first identification information JD1. The second code image CD2 corresponds to the second identification information JD2. The second code image CD2 is, for example, a one-dimensional barcode image indicating the second identification information JD2.

Although the embodiment describes a case where each of the first code image CD1 and the second code image CD2 is a one-dimensional barcode image, the first code image CD1 and the second code image CD2 are not limited thereto. Each of the first code image CD1 and the second code image CD2 may be a two-dimensional barcode image.

The document transmitter 111 transmits, to the printer 2, the document information JDC, the first code image CD1 associated with the document information JDC, and the second code image CD2 associated with the document information JDC according to a request from the printer 2.

The document transmitter 111 accepts the first identification information JD1 from the printer 2, for example. The document transmitter 111 reads the document information JDC associated with the first identification information JD1, the first code image CD1, and the second code image CD2 from the document storage unit 113. Then, the document transmitter 111 transmits, to the printer 2, the document information JDC, the first code image CD1, and the second code image CD2 that have been read from the document storage unit 113.

The determiner 112 receives the print image PP from the scanner 3. The print image PP includes the normal image PPM printed on the normal printed matter PM and the copy image PCP printed on the copied printed matter CP.

The determiner 112 determines, based on the code image CD included in the print image PP, whether the print image PP is the normal image PPM.

The normal image PPM includes, for example, the first code image CD1 and the second code image CD2. The copied printed matter CP does not include at least one of the first code image CD1 and the second code image CD2.

For example, when the print image PP does not include at least one of the first code image CD1 and the second code image CD2, the determiner 112 determines that the print image PP is not the normal image PPM and is the copy image PCP. Then, the determiner 112 transmits the determination result to the scanner 3.

For example, when the print image PP includes the first code image CD1 and the second code image CD2, the determiner 112 extracts the first code image CD1 and the second code image CD2 from the print image PP. Then, the determiner 112 determines whether the first identification information JD1 corresponding to the first code image CD1 is stored in the document storage unit 113. When the first identification information JD1 corresponding to the first code image CD1 is not stored in the document storage unit 113, the determiner 112 determines that the print image PP is not the normal image PPM. Then, the determiner 112 transmits the determination result to the scanner 3.

When the first identification information JD1 corresponding to the first code image CD1 is stored in the document storage unit 113, the determiner 112 determines whether the second identification information JD2 corresponding to the second code image CD2 is stored in the document storage unit 113 in association with the first identification information JD1 corresponding to the first code image CD1. When the second identification information JD2 corresponding to the second code image CD2 is not stored in the document storage unit 113 in association with the first identification information JD1 corresponding to the first code image CD1, the determiner 112 determines that the print image PP is not the normal image PPM. Then, the determiner 112 transmits the determination result to the scanner 3.

When the second identification information JD2 corresponding to the second code image CD2 is stored in the document storage unit 113 in association with the first identification information JD1 corresponding to the first code image CD1, the determiner 112 determines that the print image PP is the normal image PPM. Then, the determiner 112 transmits the determination result to the scanner 3.

Next, the configuration of the printer 2 is described with reference to FIG. 2.

Figure 2:
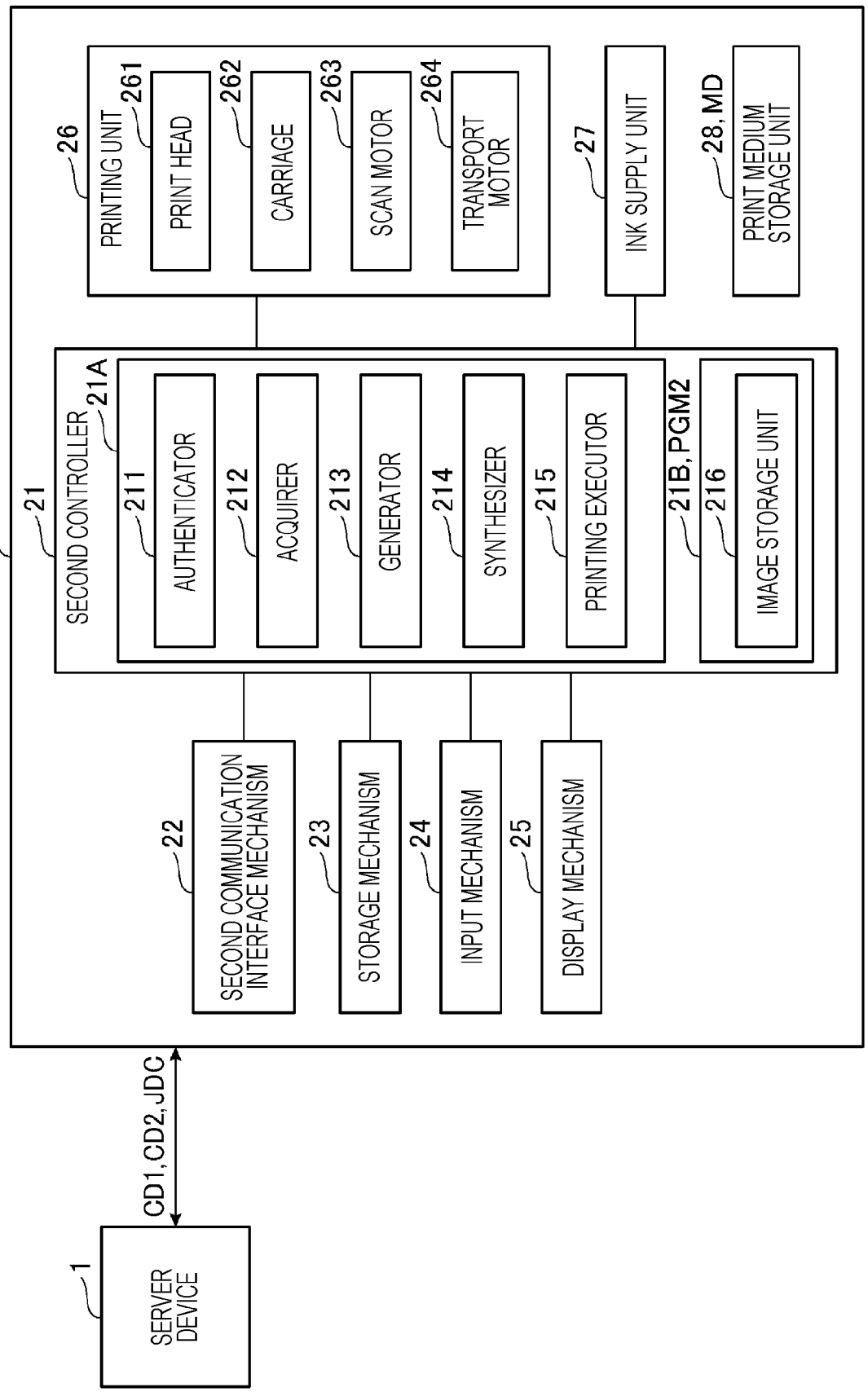
FIG. 2 is a diagram illustrating an example of a configuration of a printer.

FIG. 2 is a diagram illustrating an example of the configuration of the printer 2.

The printer 2 is a device that prints a character, an image, and the like on the print medium MD such as print paper. The embodiment describes a case where the printer 2 is an ink jet printer.

As illustrated in FIG. 2, the printer 2 includes a second controller 21, a second communication interface mechanism 22, a storage mechanism 23, an input mechanism 24, a display mechanism 25, a printing unit 26, an ink supply unit 27, and a print medium storage unit 28.

The second controller 21 controls an operation of each unit of the printer 2. The second controller 21 includes a second processor 21A and a second memory 21B.

The second communication interface mechanism 22 communicates with the server device 1 via wired communication according to the Ethernet (registered trademark) standard in accordance with an instruction from the second controller 21.

The second communication interface mechanism 22 includes a connector to be connected to an Ethernet (registered trademark) cable, and an interface circuit that processes a signal to be transmitted to the connector. The second communication interface mechanism 22 is an interface substrate having the connector and the interface circuit and is connected to a main substrate on which the second processor 21A of the second controller 21 and the like are implemented. Alternatively, the connector and the interface circuit that constitute the second communication interface mechanism 22 are implemented on the main substrate of the second controller 21.

The storage mechanism 23 includes a nonvolatile memory such as an HDD, an electrically erasable programmable read-only memory (EEPROM), or an SSD and stores various data in a rewritable manner.

The input mechanism 24 includes an operation switch included in the printer 2 and an input unit such as a touch panel. The input mechanism 24 detects an operation performed by a user on the input unit and outputs a detection signal corresponding to the operation to the second controller 21. The second controller 21 performs, based on the detection signal input from the input mechanism 24, a process corresponding to the operation performed by the user.

The display mechanism 25 includes a display panel such as a plurality of light emitting diodes (LEDs) or a liquid crystal display (LCD). The display mechanism 25 causes the LEDs to light up, turn off, and blink, displays an image on the display panel, or the like in accordance with control by the second controller 21.

The printing unit 26 uses ink to print a character, an image, and the like on the print medium MD such as print paper in accordance with control by the second controller 21. The printing unit 26 includes a print head 261, a carriage 262, a scan motor 263, and a transport motor 264 as a configuration relating to printing.

The print head 261 is an ink jet print head. The print head 261 ejects ink supplied from the ink supply unit 27 to the print medium MD to print a character, an image, or the like on the print medium MD. The carriage 262 carries the print head 261 and performs scanning in a direction intersecting a transport direction of the print medium MD. The scan motor 263 causes the carriage 262 to perform the scanning. The transport motor 264 transports the print medium MD in the transport direction.

The ink supply unit 27 includes an ink tank for storing ink and supplies the ink to the print head 261 of the printing unit 26 from the ink tank. Colors of the ink supplied by the ink supply unit 27 are, for example, cyan (C), magenta (M), yellow (Y), and black (K).

The print medium storage unit 28 is configured to store the print medium MD. When the print medium MD is cut paper, the print medium storage unit 28 feeds the stored cut paper to a transport path by the transport performed by the transport motor 264. The transport path is not illustrated in the drawings. The print medium storage unit 28 may have a configuration for collecting the printed matter P that is the print medium MD after the printing. The configuration for collecting the printed matter P may be a configuration for stacking and mounting cut paper.

Next, functional blocks included in the second controller 21 of the printer 2 are described.

The second memory 21B stores a second control program PGM2.

The second controller 21 includes an authenticator 211, an acquirer 212, a generator 213, a synthesizer 214, a printing executor 215, and an image storage unit 216 as functional blocks.

Specifically, the second processor 21A functions as the authenticator 211, the acquirer 212, the generator 213, the synthesizer 214, and the printing executor 215 by executing the second control program PGM2. The second processor 21A causes the second memory 21B to function as the image storage unit 216 by executing the second control program PGM2.

The image storage unit 216 stores the document image PDR. The document image PDR is an image corresponding to the document information JDC. The document image PDR is generated by the generator 213 and stored by the generator 213 in the image storage unit 216.

In addition, the image storage unit 216 stores a synthetic image PS. The synthetic image PS is constituted by the document image PDR, the first code image CD1, and the second code image CD2. The synthetic image PS is generated by the synthesizer 214 and stored by the synthesizer 214 in the image storage unit 216.

The synthetic image PS is further described with reference to FIG. 3.

The authenticator 211 performs personal authentication on a user. The authenticator 211 accepts an authentication ID of the user via the input mechanism 24, for example. When the accepted authentication ID indicates the normal user, the authenticator 211 determines that the personal authentication has been successful, and accepts a print instruction from the user. On the other hand, when the accepted authentication ID does not indicate the normal user, the authenticator 211 determines that the personal authentication has failed, and does not accept the print instruction from the user.

The acquirer 212 requests the server device 1 to transmit the document information JDC based on an instruction from the user. Then, the acquirer 212 acquires, from the server device 1, the document information JDC, the first code image CD1 associated with the document information JDC, and the second code image CD2 associated with the document information JDC.

The generator 213 generates the document image PDR corresponding to the document information JDC. The generator 213 causes the document image PDR to be stored in the image storage unit 216.

The synthesizer 214 synthesizes the document image PDR, the first code image CD1, and the second code image CD2 to generate the synthetic image PS. The synthesizer 214 causes the synthetic image PS to be stored in the image storage unit 216.

The synthesizer 214 positions the document image PDR in a first printable region ARD and positions the first code image CD1 and the second code image CD2 in the end region ARE, for example. The end region ARE is included in a second printable region ARN and present outside the first printable region ARD.

The first printable region ARD is used when a frameless printing function is not used. The second printable region ARN is used when the frameless printing function is used.

In the embodiment, the first code image CD1 is positioned along an edge of the print medium MD in a first end region ARE1 and the second code image CD2 is positioned along an edge of the print medium MD in a second end region ARE2. The first end region ARE1 is located in a leftward direction DL with respect to the first printable region ARD, while the second end region ARE2 is located in a rightward direction DR with respect to the first printable region ARD.

The first printable region ARD, the second printable region ARN, the first end region ARE1, and the second end region ARE2 are further described with reference to FIG. 3.

The process of the synthesizer 214 is further described with reference to FIG. 3.

The printing executor 215 uses the frameless printing function to print the synthetic image PS on the print medium MD. The second printable region ARN that is a printable region to be used when the frameless printing function is used includes a print surface region ARP of the print medium MD. The print surface region ARP is a range of a print surface of the print medium MD.

The process of the printing executor 215 is further described with reference to FIG. 3.

FIG. 3 is a diagram illustrating an example of a frameless print region and a normal print region. FIG. 3 illustrates a case where the print medium MD is of the A4 size defined by ISO 216.

In FIG. 3, an upward direction DU, a downward direction DD, the leftward direction DL, and the rightward direction DR are indicated by arrows.

The print surface region ARP indicated by a solid line is the range of the print surface of the print medium MP. The print surface is a surface on which an image is printed on the print medium MD. The vertical size H2 of the print surface region ARP is, for example, 297 mm, while the horizontal size W2 of the print surface region ARP is, for example, 210 mm.

In FIG. 3, a vertical size is a size in the direction (vertical direction) of a longer side of the print medium MD and a horizontal size is a size in the direction (horizontal direction) of a shorter side of the print medium MD.

The first printable region ARD indicated by a broken line is a printable region to be used when the frameless printing function is not used. The first printable region ARD is positioned at the center of the print surface region ARP. Specifically, the vertical direction of the first printable region ARD is parallel to the vertical direction of the print surface region ARP, and the position PC of the center of the first printable region ARD matches the position PC of the center of the print surface region ARP. The position PC of the center of the print surface region ARP is an intersection of a first central line LC1 indicating a central position of the print surface region ARP in the horizontal direction of the print surface region ARP and a second central line LC2 indicating a central position of the print surface region ARP in the vertical direction of the print surface region ARP.

The synthesizer 214 positions the document image PDR in the first printable region ARD.

The vertical size H1 of the first printable region ARD is, for example, 291 mm, while the horizontal size W1 of the first printable region ARD is, for example, 204 mm.

In a region that is included in the print surface region ARP and present outside the first printable region ARD, that is, in the end region ARE, the vertical size $\Delta H1$ of each of a region located in the upward direction DU with respect to the first printable region ARD and a region located in the downward direction DD with respect to the first printable region ARD is calculated according to the following Equation (1).

$$\Delta H1 = (H2 - H1)/2 \qquad (1)$$

In the embodiment, since the vertical size H2 of the print surface region ARP is 297 mm, and the vertical size H1 of the first printable region ARD is, for example, 291 mm, the vertical size ΔH1 of the end region ARE is calculated to be 3 mm according to Equation (1).

In the end region ARE, the horizontal size ΔW1 of each of a region located in the leftward direction DL with respect to the first printable region ARD and a region located in the rightward direction DR with respect to the first printable region ARD, that is, the horizontal size ΔW1 of each of the first end region ARE1 and the second end region ARE2 is calculated according to the following Equation (2). The first end region ARE1 is included in the end region ARE and located in the leftward direction DL with respect to the first printable region ARD. The second end region ARE2 is included in the end region ARE and located in the rightward direction DR with respect to the first printable region ARD.

$$\Delta W1=(W2-W1)/2 \quad (2)$$

In the embodiment, the horizontal size W2 of the print surface region ARP is 210 mm and the horizontal size W2 of the first printable region ARD is, for example, 204 mm. Therefore, the horizontal size ΔW1 of each of the first end region ARE1 and the second end region ARE2 is, for example, calculated to be 3 mm according to Equation (2).

That is, in the print surface region ARP, the end region ARE with the size of 3 mm is positioned around the first printable region ARD. When the frameless printing function is not used, an image is not formed in the end region ARE.

The second printable region ARN indicated by a dashed-and-double-dotted line is a printable region to be used when the frameless printing function is used. The print surface region ARP is positioned at the center of the second printable region ARN. Specifically, the vertical direction of the second printable region ARN is parallel to the vertical direction of the print surface region ARP, and the position PC of the center of the second printable region ARN matches the position PC of the center of the print surface region ARP.

The vertical size H3 of the second printable region ARN is, for example, 301 mm, and the horizontal size W3 of the second printable region ARN is, for example, 214 mm.

In a region included in the second printable region ARN and present outside the print surface region ARP, the vertical size ΔH2 of each of a region located in the upward direction DU with respect to the print surface region ARP and a region located in the downward direction DD with respect to the print surface region ARP is calculated according to the following Equation (3).

$$\Delta H2=(H3-H2)/2 \quad (3)$$

In the embodiment, since the vertical size H3 of the second printable region ARN is 301 mm and the vertical size H2 of the print surface region ARP is 297 mm, the vertical size ΔH2 is calculated to be 2 mm according to Equation (3).

In the region included in the second printable region ARN and present outside the print surface region ARP, the horizontal size ΔW2 of each of the region located in the leftward direction DL with respect to the print surface region ARP and the region located in the rightward direction DR with respect to the print surface region ARP is calculated according to the following Equation (4).

$$\Delta W2=(W3-W2)/2 \quad (4)$$

In the embodiment, since the horizontal size W3 of the second printable region ARN is 214 mm and the horizontal size W2 of the print surface region ARP is 210 mm, the horizontal size ΔW2 is calculated to be 2 mm according to Equation (4).

That is, in the second printable region ARN, the region with the size of 2 mm is positioned around the print surface region ARP. This region is a region in which the print medium MD is not positioned when the print medium MD is transported to a normal printing position even when the frameless printing function is used.

The end region ARE is a region included in the second printable region ARN and present outside the first printable region ARD. The end region ARE includes the first end region ARE1 and the second end region ARE2.

In the embodiment, the first end region ARE1 is an end region ARE included in the second printable region ARN and located in the leftward direction DL with respect to the first printable region ARD. The second end region ARE2 is an end region ARE included in the second printable region ARN and located in the rightward direction DR with respect to the first printable region ARD.

The synthesizer 214 positions the first code image CD1 along the edge of the print medium MD in the first end region ARE1. In other words, the synthesizer 214 positions the first code image CD1 in the first end region ARE1 such that the direction of a longer side of the first code image CD1 is parallel to the vertical direction of the print medium MD.

In addition, the synthesizer 214 positions the second code image CD2 along the edge of the print medium MD in the second end region ARE2. In other words, the synthesizer 214 positions the second code image CD2 in the second end region ARE2 such that the direction of a longer side of the second code image CD2 is parallel to the vertical direction of the print medium MD.

Therefore, the horizontal size CW1 of the first code image CD1 is equal to or smaller than the horizontal size ΔW1 of the first end region ARE1. In addition, the horizontal size CW2 of the second code image CD2 is equal to or smaller than the horizontal size ΔW1 of the second end region ARE2. The horizontal size CW1 is the size of the first code image CD1 in the horizontal direction. The horizontal size CW2 is the size of the second code image CD2 in the horizontal direction.

The embodiment describes a case where the first end region ARE1 and the second end region ARE2 are end regions ARE arranged opposite to each other in the horizontal direction on the print medium MD, but the first end region ARE1 and the second end region ARE2 are not limited thereto. The first end region ARE1 and the second end region ARE2 may be end regions ARE arranged opposite to each other in the vertical direction on the print medium MD.

As illustrated in FIG. 3, a part (right part) of the first code image CD1 is located in the print surface region ARP, and the other part (left part) of the first code image CD1 is located outside the print surface region ARP. Therefore, the part (right part) of the first code image CD1 that is located in the print surface region ARP is formed on the print medium MD.

Similarly, a part (left part) of the second code image CD2 is located in the print surface region ARP and the other part (right part) of the second code image CD2 is located outside the print surface region ARP. Therefore, the part (left part) of the second code image CD2 that is located in the print surface region ARP is formed on the print medium MD.

Figure 4:
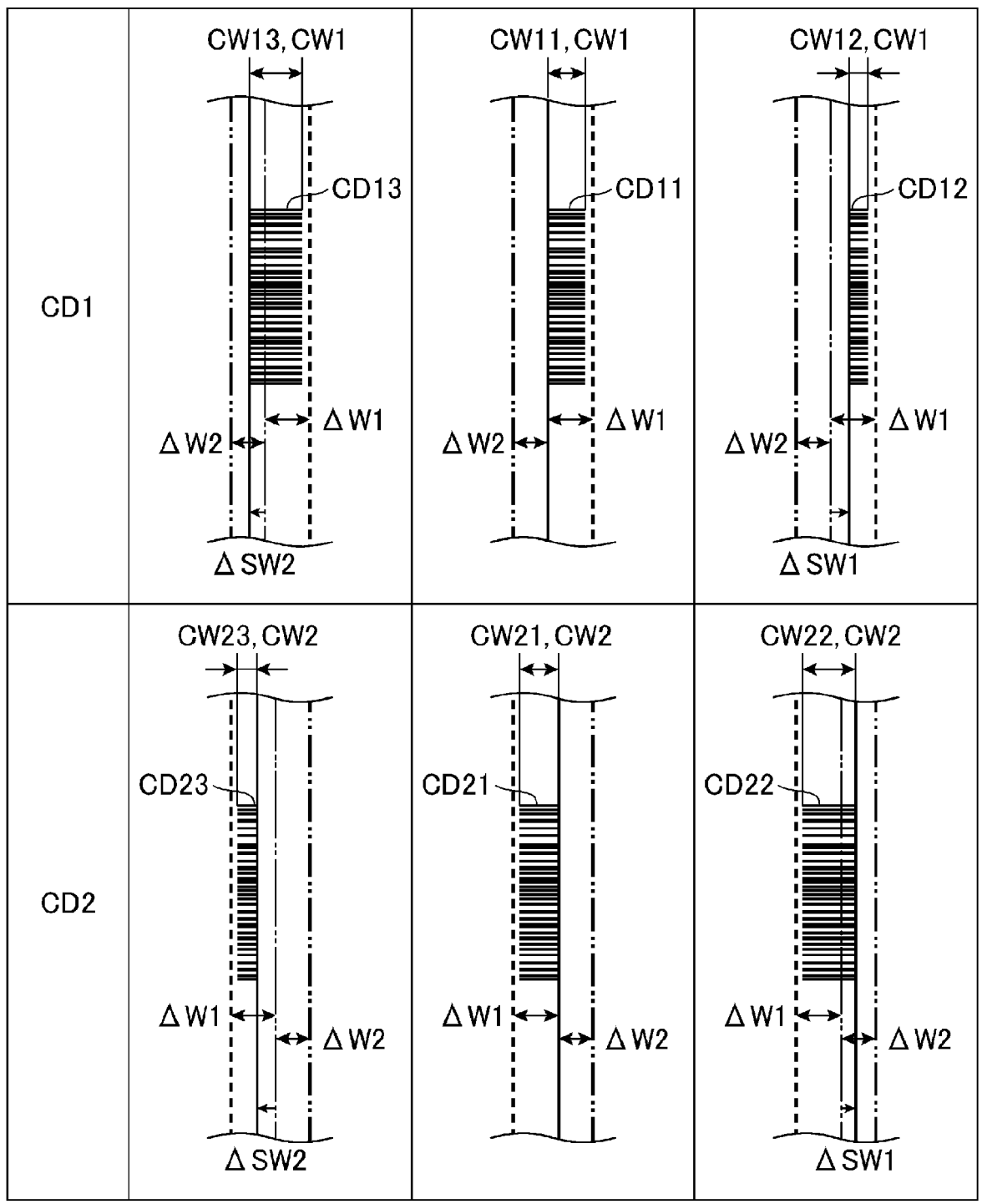
FIG. 4 is a diagram illustrating a relationship between a first code image and a second code image and a deviation during printing.

FIG. 4 is a diagram illustrating a relationship between the first code image CD1 and the second code image CD2 and a deviation during printing.

In the printer 2, at the time of printing, at the transport path or the like, the print medium MD may deviate from its normal position in at least one of the upward direction DU, the downward direction DD, the leftward direction DL, and the rightward direction DR that are illustrated in FIG. 3. In addition, a deviation ΔSW of the print medium MD in each of the upward direction DU, the downward direction DD, the leftward direction DL, and the rightward direction DR is, for example, equal to or smaller than 2 mm.

As illustrated in FIG. 3, the normal position is a position where the print medium MD is positioned at the center of the second printable region ARN. In other words, when the print medium MD is positioned at the normal position, the value of the horizontal size ΔW2 of the left end of the second printable region ARN matches the value of the horizontal size ΔW2 of the right end of the second printable region ARN. That is, both of the values are 2 mm.

In the embodiment, the first code image CD1 is formed at the left end of the print medium MD and the second code image CD2 is formed at the right end of the print medium MD. When the print medium MD deviates from the normal position in the leftward direction DL or the rightward direction DR, the size of the first code image CD1 formed on the print medium MD in the horizontal direction and the size of the second code image CD2 formed on the print medium MD in the horizontal direction change.

Therefore, the relationship between the deviation of the print medium MD from the normal position in the leftward direction DL or the rightward direction DR and the first code image CD1 and the second code image CD2 formed on the print medium MD is described with reference to FIG. 4.

An upper part of FIG. 4 illustrates the first code image CD1 formed on the print medium MD, while a lower part of FIG. 4 illustrates the second code image CD2 formed on the print medium MD.

In addition, a left column of FIG. 4 illustrates a case where the print medium MD deviates from the normal position by a deviation ΔSW2 in the leftward direction DL. A central column of FIG. 4 illustrates a case where the print medium MD is positioned at the normal position. A right column of FIG. 4 illustrates a case where the print medium MD deviates from the normal position by a deviation ΔSW1 in the rightward direction DR.

First, a description will be made with reference to the central column of FIG. 4. As illustrated in the upper part of FIG. 4, when the print medium MD is positioned at the normal position, the horizontal size CW1 of a first code image CD11 formed on the print medium MD is equal to a horizontal size CW11. The first code image CD11 is the first code image CD1 formed on the print medium MD when the print medium MD is positioned at the normal position.

The horizontal size CW1 is the size of the first code image CD11 in the horizontal direction. The horizontal size CW11 is smaller than the horizontal size ΔW1 illustrated in FIG. 3. In the embodiment, since the horizontal size ΔW1 is 3 mm, the horizontal size CW11 is set to, for example, 2.8 mm.

In addition, as illustrated in the lower part of FIG. 4, when the print medium MD is positioned at the normal position, the horizontal size CW2 of a second code image CD21 formed on the print medium MD is equal to a horizontal size CW21. The second code image CD21 is the second code image CD2 formed on the print medium MD when the print medium MD is positioned at the normal position.

The horizontal size CW2 is the size of the second code image CD21 in the horizontal direction. The horizontal size CW21 is smaller than the horizontal size ΔW1 illustrated in FIG. 3. In the embodiment, since the horizontal size ΔW1 is 3 mm, the horizontal size CW21 is set to, for example, 2.8 mm.

Next, a description will be made with reference to the right column of FIG. 4. As illustrated in the upper part of FIG. 4, when the print medium MD deviates from the normal position by the deviation ΔSW1 in the rightward direction DR, the horizontal size CW1 of a first code image CD12 formed on the print medium MD is equal to a horizontal size CW12. The first code image CD12 is the first code image CD1 formed on the print medium MD when the print medium MD deviates from the normal position by the deviation ΔSW1 in the rightward direction DR.

The horizontal size CW12 is calculated according to the following Equation (5).

$$CW12 = CW11 - \Delta SW1 \quad (5)$$

When the horizontal size CW11 is, for example, 2.8 mm, and the deviation ΔSW1 is, for example, 2 mm, the horizontal size CW12 is, for example, 0.8 mm.

As described above with reference to the right column of FIG. 4, when the print medium MD deviates from the normal position by the deviation ΔSW1 in the rightward direction DR, the first code image CD12 is formed on the print medium MD and thus it is necessary to set the horizontal size CW11 to a value larger than the deviation ΔSW1 according to the above-described Equation (5).

As illustrated in the lower part of FIG. 4, when the print medium MD deviates from the normal position by the deviation ΔSW1 in the rightward direction DR, the horizontal size CW2 of a second code image CD22 formed on the print medium MD is equal to a horizontal size CW22. The second code image CD22 is the second code image CD2 formed on the print medium MD when the print medium MD deviates from the normal position by the deviation ΔSW1 in the rightward direction DR.

The horizontal size CW22 is calculated according to the following Equation (6).

$$CW22 = CW21 + \Delta SW1 \quad (6)$$

When the horizontal size CW21 is, for example, 2.8 mm, and the deviation ΔSW1 is, for example, 2 mm, the horizontal size CW22 is 4.8 mm.

Next, a description will be made with reference to the left column of FIG. 4. As illustrated in the upper part of FIG. 4, when the print medium MD deviates from the normal position by the deviation ΔSW2 in the leftward direction DL, the horizontal size CW1 of a first code image CD13 formed on the print medium MD is equal to a horizontal size CW13. The first code image CD13 is the first code image CD1 formed on the print medium MD when the print medium MD deviates from the normal position by the deviation ΔSW2 in the leftward direction DL.

The horizontal size CW13 is calculated according to the following Equation (7).

$$CW13 = CW11 + \Delta SW2 \quad (7)$$

When the horizontal size CW11 is, for example, 2.8 mm, and the deviation ΔSW2 is, for example, 2 mm, the horizontal size CW13 is 4.8 mm.

As illustrated in the lower part of FIG. 4, when the print medium MD deviates from the normal position by the deviation ΔSW2 in the leftward direction DL, the horizontal size CW2 of a second code image CD23 formed on the print medium MD is equal to a horizontal size CW23. The second code image CD23 is the second code image CD2 formed on the print medium MD when the print medium MD deviates from the normal position by the deviation ΔSW2 in the leftward direction DL.

The horizontal size CW23 is calculated according to the following Equation (8).

$$CW23 = CW21 - \Delta SW2 \tag{8}$$

When the horizontal size CW21 is, for example, 2.8 mm and the deviation ΔSW2 is, for example, 2 mm, the horizontal size CW12 is 0.8 mm.

As described with reference to the left column of FIG. 4, when the print medium MD deviates from the normal position by the deviation ΔSW2 in the leftward direction DL, the second code image CD23 is formed on the print medium MD and thus it is necessary to set the horizontal size CW21 to a value larger than the deviation ΔSW2 according to the above-described Equation (8).

As described with reference to FIG. 4, even when the print medium MD deviates from the normal position in the leftward direction DL or the rightward direction DR, the first code image CD1 and the second code image CD2 are formed on the print medium MD.

As described with reference to FIGS. 3 and 4, the horizontal size CW1 of the first code image CD1 and the horizontal size CW2 of the second code image CD2 are set to values satisfying the following Inequalities (9) and (10), respectively.

$$\Delta SW1 < CW1 < \Delta W1 \tag{9}$$

$$\Delta SW2 < CW2 < \Delta W1 \tag{10}$$

Each of the horizontal sizes CW1 and CW2 corresponds to an example of a "size of a code image in a direction of a shorter side of the code image".

The horizontal size ΔW1 corresponds to an example of a "size of the first and second end regions in a direction of shorter sides of the first and second end regions".

FIG. 5 is a diagram illustrating an example of the normal printed matter PM. FIG. 5 illustrates a first normal printed matter PM1 that is the normal printed matter PM when the print medium MD is positioned at the normal position. A first normal image PPM1 is formed on the first normal printed matter PM1. The first normal image PPM1 is the normal image PPM formed on a first print surface region ARP1 of the first normal printed matter PM1 when the print medium MD is positioned at the normal position. The first print surface region ARP1 is a region of the print surface of the print medium MD constituting the first normal printed matter PM1.

As illustrated in FIG. 5, the first normal image PPM1 includes the document image PDR, the first code image CD11, and the second code image CD21.

The document image PDR is formed in the first printable region ARD of the print medium MD. The first code image CD11 is formed in the first end region ARE1. The second code image CD21 is formed in the second end region ARE2.

As described with reference to FIG. 4, the horizontal size CW1 of the first code image CD11 is the horizontal size CW11, and the horizontal size CW2 of the second code image CD21 is the horizontal size CW21. The horizontal size CW11 is, for example, 2.8 mm and the horizontal size CW21 is, for example, 2.8 mm.

A first reading region ARS1 is a region from which the scanner 3 reads an image formed on the print medium MD. The first reading region ARS1 matches the region of the first normal image PPM1. That is, the image read by the scanner 3 matches the first normal image PPM1. The scanner 3 transmits the first normal image PPM1 as the print image PP to the server device 1.

Since the print image PP (first normal image PPM1 in this case) includes the first code image CD11 and the second code image CD21, the determiner 112 of the server device 1 determines that the print image PP is the normal image PPM.

A second reading region ARS2 is a region from which the copier 4 reads an image formed on the print medium MD. In FIG. 5, the second reading region ARS2 matches the first printable region ARD. The copier 4 reads the document image PDR of the first printable region ARD. Then, the copier 4 forms the document image PDR on the print medium MD to generate a first copied printed matter CP1 illustrated in FIG. 6.

Although the embodiment describes a case where the second reading region ARS2 matches the first printable region ARD, the second reading region ARS2 is not limited thereto. When the second reading region ARS2 is different from the first printable region ARD, the horizontal size CW1 of the first code image CD1 and the horizontal size CW2 of the second code image CD2 need to satisfy the following Inequalities (11) and (12), respectively.

$$CW1 < \Delta SW1 + \Delta RW \tag{11}$$

$$CW2 < \Delta SW2 + \Delta RW \tag{12}$$

In this case, the horizontal size ΔRW is a size of a region, which is included in a non-reading region and extends along the direction of the longer side of the print medium MD, in the horizontal direction. The non-reading region is a region included in the print surface of the print medium MD and present outside the second reading region ARS2.

When Inequality (11) or Inequality (12) is not satisfied, the print image PP of the copied printed matter CP includes the first code image CD1 and the second code image CD2 in a certain case. In this case, the determiner 112 of the server device 1 may not be able to determine whether the print image PP is the normal image PPM.

FIG. 6 is a diagram illustrating an example of the copied printed matter CP. FIG. 6 illustrates the first copied printed matter CP1 corresponding to the first normal printed matter PM1 illustrated in FIG. 5.

In FIG. 5, since the second reading region ARS2 matches the first printable region ARD, the copier 4 reads the document image PDR of the first printable region ARD and forms the document image PDR on the print medium MD. As illustrated in FIG. 6, the document image PDR is formed in a first copy surface region ARCP1 of the first copied printed matter CP1, and the first code image CD1 and the second code image CD2 are not formed. The first copy surface region ARCP1 is a region of a copy surface of the first copied printed matter CP1.

The first copy surface region ARCP1 matches a region from which the scanner 3 reads an image formed on the print medium MD. That is, the image read by the scanner 3 matches the first normal image PPM1. The scanner 3 transmits a first copy image PCP1 as the print image PP of the first copied printed matter CP1 to the server device 1. The first copy image PCP1 includes the document image PDR and does not include the first code image CD1 and the second code image CD2.

Since the print image PP (first copy image PCP1 in this case) does not include the first code image CD11 and the second code image CD21, the determiner 112 of the server device 1 determines that the print image PP is the copied printed matter CP.

Figure 7:
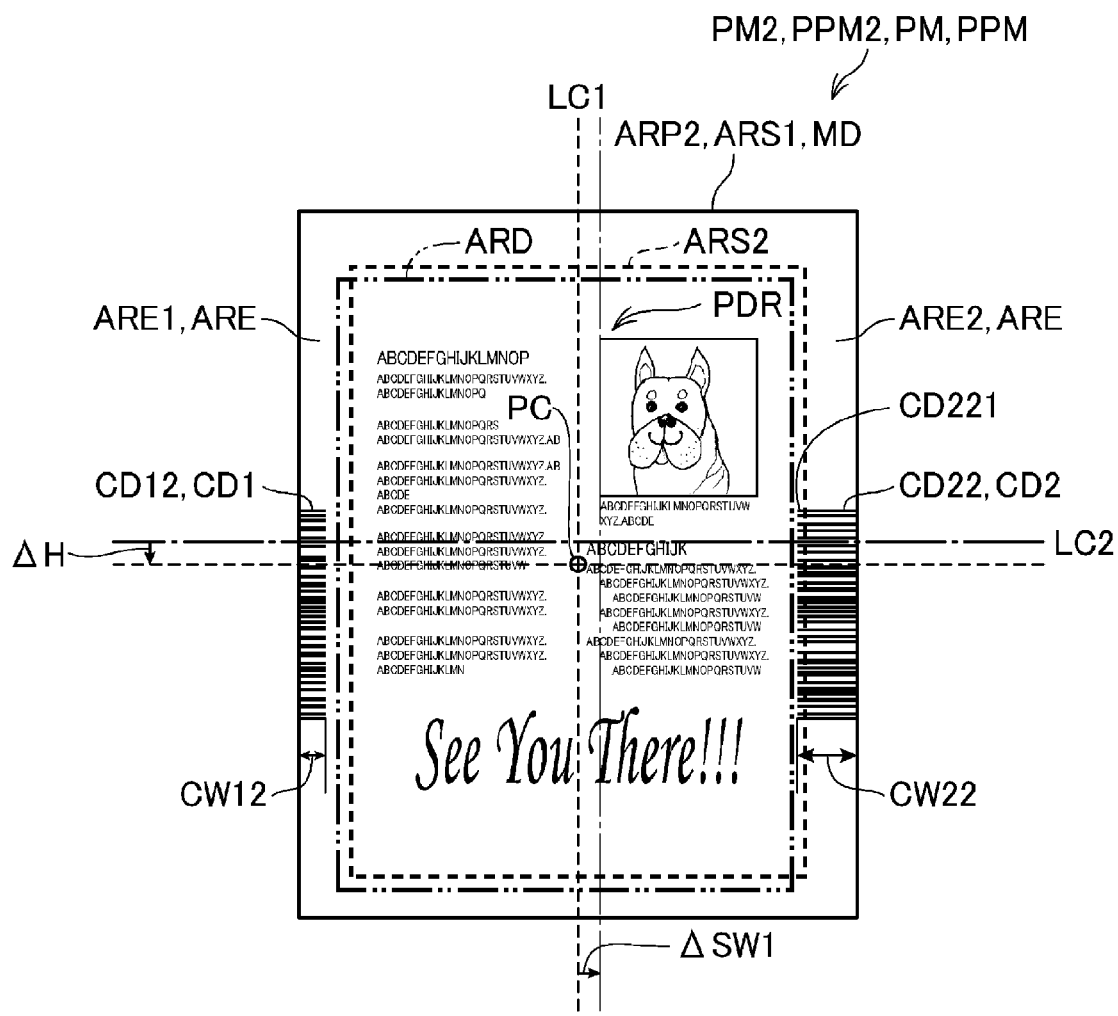
FIG. 7 is a diagram illustrating another example of the normal printed matter.

FIG. 7 is a diagram illustrating another example of the normal printed image PM. FIG. 7 illustrates a second normal printed matter PM2 that is the normal printed matter PM when the print medium MD deviates from the normal position by the deviation ΔSW1 in the rightward direction DR. A second normal image PPM2 is formed on the second normal printed matter PM2. The second normal image PPM2 is the normal image PPM formed in a second print surface region ARP2 of the second normal printed matter PM2 when the print medium MD deviates from the normal position by the deviation ΔSW1 in the rightward direction DR. The second print surface region ARP2 is a region of the print surface of the print medium MD constituting the second normal printed matter PM2.

As illustrated in FIG. 7, the second normal image PPM2 includes the document image PDR, the first code image CD12, and the second code image CD22.

The document image PDR is formed in the first printable region ARD of the print medium MD. The first code image CD12 is formed in the first end region ARE1. The second code image CD22 is formed in the second end region ARS2.

As described with reference to FIG. 4, the horizontal size CW1 of the first code image CD12 is equal to the horizontal size CW12 and the horizontal size CW2 of the second code image CD22 is equal to the horizontal size CW22. The horizontal size CW12 is, for example, 0.8 mm and the horizontal size CW22 is, for example, 4.8 mm.

The second reading region ARS2 is a region from which the scanner 3 reads an image formed on the print medium MD. The second reading region ARS2 matches the region of the second normal image PPM2. That is, the image read by the scanner 3 matches the second normal image PPM2. Therefore, the scanner 3 transmits the second normal image PPM2 as the print image PP to the server device 1.

Since the print image PP (second normal image PPM2 in this case) includes the first code image CD12 and the second code image CD22, the determiner 112 of the server device 1 determines that the print image PP is the normal image PPM.

The second reading region ARS2 is a region from which the copier 4 reads an image formed on the print medium MD. In FIG. 7, the second reading region ARS2 is set at a position shifted from the first printable region ARD in the rightward direction DR by the deviation ΔSW1. In other words, the copier 4 sets, as the second reading region ARS2, a region included in the print medium MD and excluding the end region ARE. The copier 4 reads the document image PDR of the second reading region ARS2 and a second code image CD221. The second code image CD221 is an image located at the left end of the second code image CD22 and included in the second reading region ARS2. The copier 4 forms the document image PDR and the second code image CD221 on the print medium MD to generate a second copied printed matter CP2 illustrated in FIG. 8.

FIG. 8 is a diagram illustrating another example of the copied printed matter CP. FIG. 8 illustrates the second copied printed matter CP2 corresponding to the second normal printed matter PM2 illustrated in FIG. 7.

As illustrated in FIG. 8, the document image PDR and the second code image CD221 are formed in a second copy surface region ARCP2 of the second copied printed matter CP2, and the first code image CD1 is not formed. The second copy surface region ARCP2 is a region of a copy surface of the second copied printed matter CP2.

The second copy surface region ARCP2 matches a region from which the scanner 3 reads an image formed on the print medium MD. That is, the image read by the scanner 3 matches the second normal image PPM2. Therefore, the scanner 3 transmits the second copy image PCP2 as the print image PP of the second copied printed matter CP2 to the server device 1. The second copy image PCP2 includes the document image PDR and the second code image CD221 and does not include the first code image CD1.

Since the print image PP (second copy image PCP2 in this case) of the second copied printed matter CP2 does not include the first code image CD1, the determiner 112 of the server device 1 determines that the print image PP is not the normal image PPM.

As described with reference to FIGS. 3 to 8, when the print image PP includes the first code image CD1 and the second code image CD2, the determiner 112 determines that the print image PP is the normal image PPM. In addition, when the print image PP does not include at least one of the first code image CD1 and the second code image CD2, the determiner 112 determines that the print image PP is not the normal image PPM. Therefore, it is possible to accurately determine whether the print image PP is the normal image PPM.

Next, a process of the second controller 21 of the printer 2 is described with reference to FIG. 9.

Figure 9:
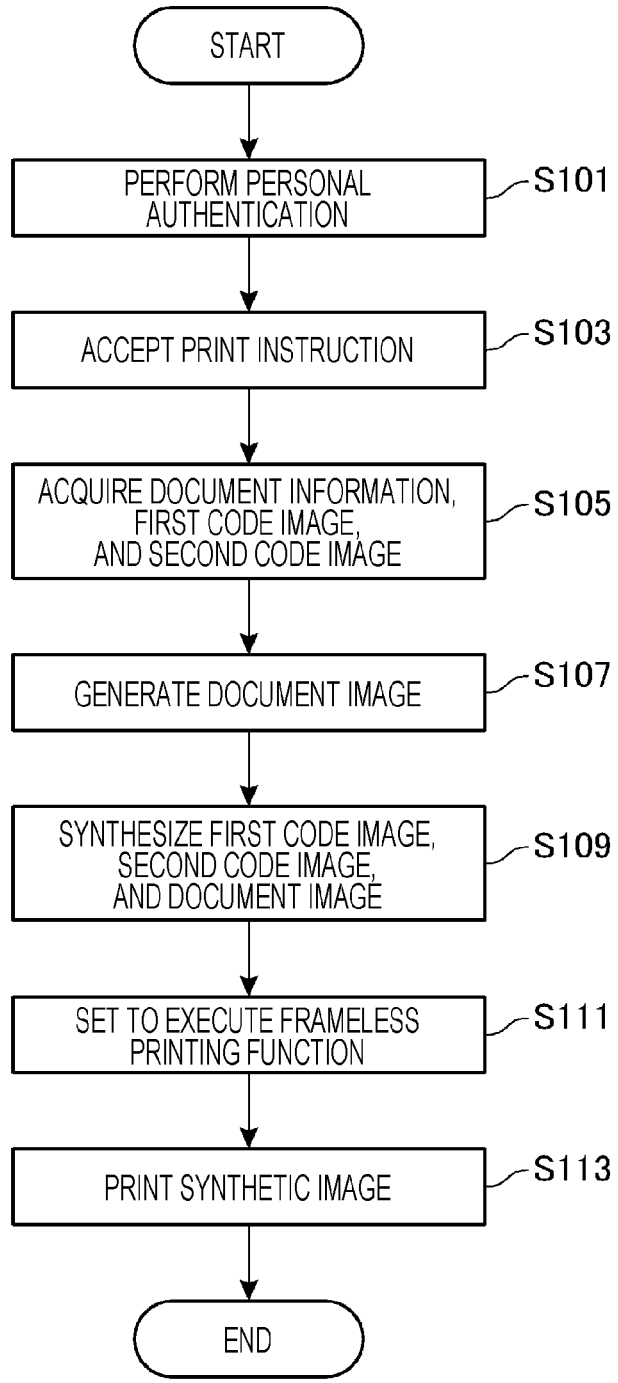
FIG. 9 is a flowchart illustrating an example of a process of the printer.

FIG. 9 is a flowchart illustrating an example of the process of the printer 2.

First, in step S101, the authenticator 211 performs personal authentication on a user. When the personal authentication fails, the process is ended after the personal authentication. When the personal authentication is successful, the process proceeds to step S103.

In step S103, the acquirer 212 accepts a print instruction from the user and requests the server device 1 to transmit the document information JDC.

Next, in step S105, the acquirer 212 acquires, from the server device 1, the document information JDC, the first code image CD1 associated with the document information JDC, and the second code image CD2 associated with the document information JDC.

Next, in step S107, the generator 213 generates the document image PDR corresponding to the document information JDC.

Next, in step S109, the synthesizer 214 synthesizes the document image PDR, the first code image CD1, and the second code image CD2 to generate the synthetic image PS. For example, the synthesizer 214 positions the document image PDR in the first printable region ARD, positions the first code image CD1 in the first end region ARE1, and positions the second code image CD2 in the second end region ARE2.

Next, in step S111, the printing executor 215 sets a setting for executing the frameless printing function.

Next, in step S113, the printing executor 215 uses the frameless printing function to print the synthetic image PS on the print medium MD. After that, the process is ended.

Next, a process of the first controller 11 of the server device 1 is described with reference to FIG. 10.

Figure 10:
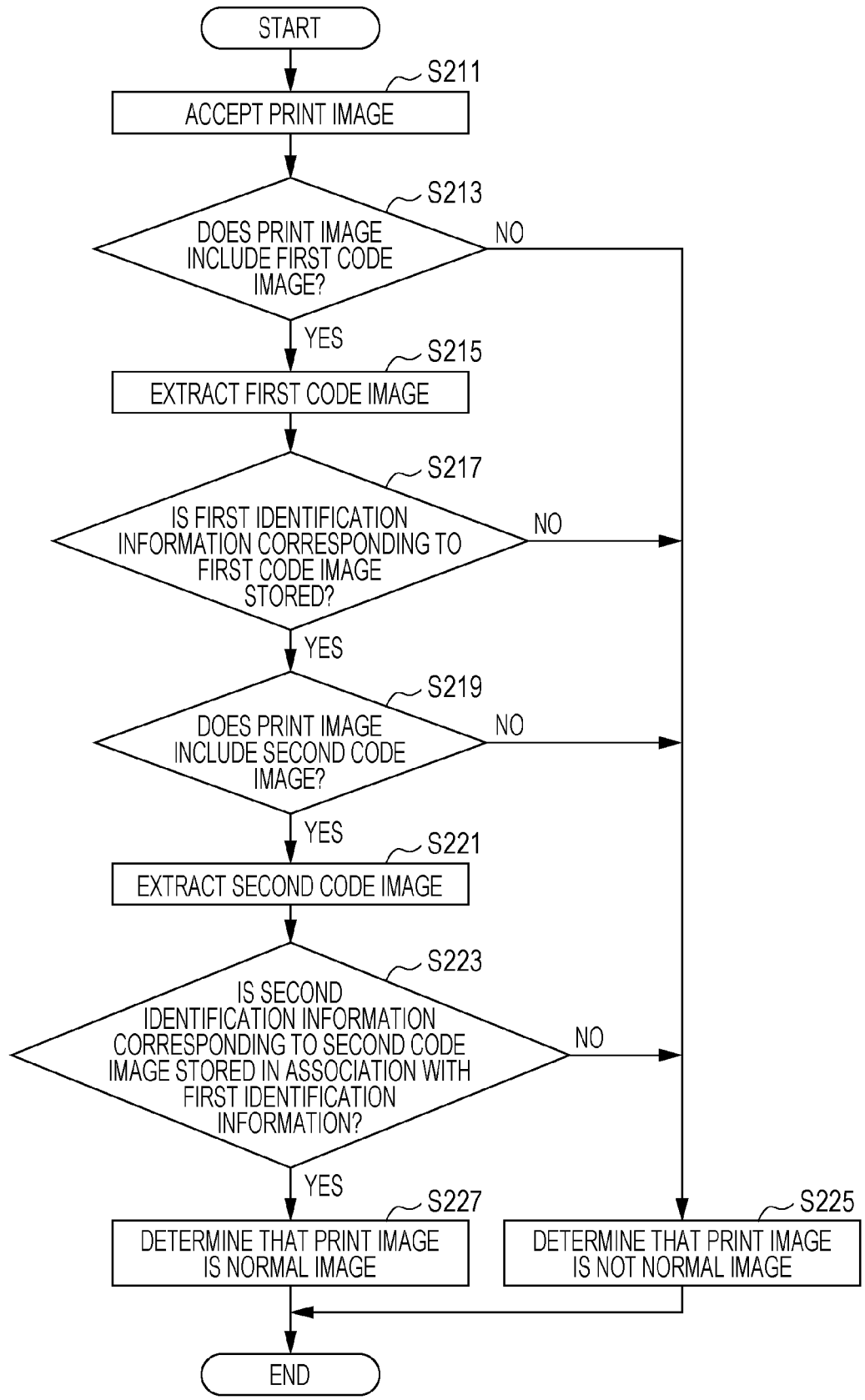
FIG. 10 is a flowchart illustrating an example of a process of a server device.

FIG. 10 is a flowchart illustrating an example of the process of the server device 1.

First, in step S211, the determiner 112 receives the print image PP from the scanner 3.

Next, in step S213, the determiner 112 determines whether the print image PP includes the first code image CD1.

When the determiner 112 determines that the print image PP does not include the first code image CD1 (NO in step S213), the process proceeds to step S225. When the determiner 112 determines that the print image PP includes the first code image CD1 (YES in step S213), the process proceeds to step S215.

Next, in step S215, the determiner 112 extracts the first code image CD1 from the print image PP.

Then, in step S217, the determiner 112 determines whether the first identification information JD1 corresponding to the first code image CD1 is stored in the document storage unit 113.

When the determiner 112 determines that the first identification information JD1 corresponding to the first code image CD1 is not stored in the document storage unit 113 (NO in step S207), the process proceeds to step S225. When the determiner 112 determines that the first identification information JD1 corresponding to the first code image CD1 is stored in the document storage unit 113 (YES in step S207), the process proceeds to step S219.

In step S219, the determiner 112 determines whether the print image PP includes the second code image CD2.

When the determiner 112 determines that the print image PP does not include the second code image CD2 (NO in step S219), the process proceeds to step S225. When the determiner 112 determines that the print image PP includes the second code image CD2 (YES in step S219), the process proceeds to step S221.

In step S221, the determiner 112 extracts the second code image CD2 from the print image PP.

Next, in step S223, the determiner 112 determines whether the second identification information JD2 corresponding to the second code image CD2 is stored in the document storage unit 113 in associated with the first identification information JD1 determined in step S217.

When the determiner 112 determines that the second identification information JD2 corresponding to the second code image CD2 is not stored in the document storage unit 113 in association with the first identification information JD1 determined in step S217 (NO in step S223), the process proceeds to step S225.

In step S225, the determiner 112 determines that the print image PP is not the image (that is, the normal image PPM) printed on the normal printed matter PM, and transmits the determination result to the scanner 3. After that, the process is ended.

When the determiner 112 determines that the second identification information JD2 corresponding to the second code image CD2 is stored in the document storage unit 113 in association with the first identification information JD1 determined in step S217 (YES in step S223), the process proceeds to step S227.

In step S227, the determiner 112 determines that the print image PP is the image (that is, the normal image PPM) printed on the normal printed matter PM, and transmits the determination result to the scanner 3. After that, the process is ended.

As described with reference to FIG. 10, the determiner 112 determines whether the print image PP is an image printed on the normal printed matter PM, based on whether the print image PP includes the first code image CD1 and the second code image CD2. Therefore, with a simple configuration, it is possible to determine whether the print image PP is an image printed on the normal printed matter PM.

As described above with reference to FIGS. 1 to 10, the document determination system 100 according to the embodiment includes the server device 1 that stores the identification information JD in association with the document information JDC, the printer 2 that prints the document image PDR corresponding to the document information JDC and the code image CD indicating the identification information JD on the print medium MD to generate the normal printed matter PM, and the scanner 3 that reads the print image PP printed on the printed matter P including the normal printed matter PM and the copied printed matter CP obtained by copying the normal printed matter PM. The printer 2 prints the code image CD in the preset end region ARE of the print medium MD. The server device 1 determines, based on the code image CD included in the print image PP read by the scanner 3, whether the printed matter P is the normal printed matter PM.

According to this configuration, whether the printed matter P is the normal printed matter PM is determined based on the code image CD included in the print image PP read by the scanner 3. Therefore, with a simple configuration, it is possible to determine whether the printed matter P is the normal printed matter PM.

In addition, the code image CD is constituted by the first code image CD1 and the second code image CD2 different from the first code image CD1. The print medium MD has the first and second end regions ARE1 and ARE2 arranged opposite in the vertical direction or the horizontal direction, and the printer 2 prints the first code image CD1 in the first end region ARE1 on the print medium MD and prints the second code image CD2 in the second end region ARE2 arranged opposite to the first end region ARE1.

According to this configuration, the first code image CD1 is printed in the first end region ARE1 included in the end regions ARE arranged opposite to each other in the vertical direction or the horizontal direction on the print medium MD, and the second code image CD2 is printed in the second end region ARE2 arranged opposite to the first end region ARE1. Thus, it is possible to determine whether the printed matter P is the normal printed matter PM based on whether the print image PP includes the first code image CD1 and the second code image CD2. Therefore, with a simple configuration, it is possible to determine whether the printed matter P is the normal printed matter PM.

In addition, the code image CD is a rectangular image. The direction of a longer side of the code image CD extends along an edge of the print medium MD. The size of the code image CD in the direction of a shorter side of the code image CD is larger than a deviation ΔSW of the print medium MD during printing and is smaller than a size of the first and second end regions ARE1 and ARE2 in a direction of shorter sides of the first and second end regions ARE1 and ARE2.

According to this configuration, the size of the code image CD in the direction of the shorter side of the code image CD is larger than the deviation ΔSW of the print medium MD during printing. Therefore, even when the print medium MD deviates during printing, the print image PP of the normal printed matter PM includes the first code image CD1 and the second code image CD2.

In addition, since the size of the code image CD in the direction of the shorter side of the code image CD is smaller than the size of the first and second end regions ARE1 and ARE2 in the direction of the shorter sides of the first and second end regions ARE1 and ARE2, it is possible to reduce the possibility that the first code image CD1 and the second code image CD2 overlap the document image PDR.

In addition, the server device 1 determines whether the printed matter P is the normal printed matter PM based on the first code image CD1 and the second code image CD2 that are included in the print image PP read by the scanner 3.

According to this configuration, whether the printed matter P is the normal printed matter PM is determined based on the first code image CD1 and the second code image CD2 that are included in the print image PP. Therefore, with a simple configuration, it is possible to determine whether the printed matter P is the normal printed matter PM.

In addition, the printer 2 uses the frameless printing function to print the code image CD in the end region ARE.

According to this configuration, since the frameless printing function is used to print the code image CD in the end region ARE, it is possible to print the code image CD in the end region ARE.

In addition, the scanner 3 reads the entire print image PP of the print medium MD on a surface that is included in the print medium MD constituting the printed matter P and on which the print image PP is already formed.

According to this configuration, since the scanner 3 reads the entire print image PP of the print medium MD, the code image CD can be included in the print image PP printed on the normal printed matter PM and read by the scanner 3.

In addition, the copier 4 that generates the copied printed matter CP reads an image of a region included in the normal printed matter PM and excluding the end region ARE and prints the read image on the print medium MD.

According to this configuration, since the copier 4 reads the image of the region included in the normal printed matter PM and excluding the end region ARE and prints the read image on the print medium MD, it is possible to prevent the code image CD from being included in the print image PP of the copied printed matter CP.

The printer 2 according to the embodiment acquires, from the server device 1, the document information JDC and the code image CD indicating the identification information JD associated with the document information JDC and prints the code image CD and the document image PDR corresponding to the document information JDC on the print medium MD to generate the printed matter P. The printer 2 prints the code image CD in the preset end region ARE of the print medium MD.

According to this configuration, since the code image CD is printed in the preset end region ARE of the print medium MD, it is possible to determine whether the printed matter P is the normal printed matter PM based on the code image CD included in the print image PP read by the scanner 3.

The embodiment describes an aspect and can be modified and applied without departing from the gist of the embodiment.

Although the embodiment describes the case where the "information processing device" is the server device 1, the "information processing device" is not limited thereto. It suffices for the "information processing device" to be configured to be able to communicate with the printer 2 and the scanner 3 and include the document transmitter 111, the determiner 112, and the document storage unit 113.

Although the embodiment describes the case where the "printing device" is the printer 2 that is an ink jet printer and uses ink as a printing material, the "printing device" is not limited thereto. The "printing device" may be an electrophotographic printer that uses toner as a printing material, for example.

Although the embodiment describes the case where the server device 1 transmits the document information JDC and the code image CD to the printer 2, the server device 1 is not limited thereto. The server device 1 may transmit the document information JDC and the identification information JD to the printer 2, and the printer 2 may generate the code image CD corresponding to the identification information JD.

Although the embodiment describes the case where the printer 2 prints the first code image CD1 and the second code image CD2 in the end regions ARE arranged opposite to each other in the horizontal direction, the printer 2 is not limited thereto. The printer 2 may print the first code image CD1 and the second code image CD2 in the end regions ARE arranged opposite to each other in the vertical direction.

Although the embodiment describes the document determination method that is implemented by executing the first control program PGM1 by the first processor 11A included in the server device 1, the first control program PGM1 that is executed by the first processor 11A to implement the document determination method can be configured in the form of a computer-readable print medium having the first control program PGM1 recorded therein or can be configured in the form of a transmission medium for transmitting the first control program PGM1.

As the above-described print medium, a magnetic print medium, an optical print medium, or a semiconductor memory device can be used. The print medium may be a flexible disk, an HDD, a compact disc read-only memory (CD-ROM), a digital versatile disc (DVD), a Blu-ray (registered trademark) disc, a magneto-optical disc, a flash memory, a portable card type print medium, or a fixed print medium. The above-described print medium may be a nonvolatile storage device that is an internal storage device included in the server device 1 and is a RAM, a ROM, an HDD, or the like.

The functions of the first controller 11 of the server device 1 may be implemented by one or a plurality of processors or a semiconductor chip. The first controller 11 may further include a co-processor such as a system on a chip (SoC), a micro control unit (MCU), or a field-programmable gate array (FPGA). The first controller 11 may cause the CPU and the co-processor to collaborate with each other to perform the various types of control or may selectively use one of the CPU and the co-processor to perform the various types of control.

The process units of the flowchart of FIG. 10 are obtained by dividing the process of the first controller 11 according to the main process contents to easily understand the process of the first controller 11 and are not limited by the names of the process units and by how the process is divided into the process units. The process units of the flowchart may be divided into a larger number of process units. The process units may be divided such that one or more of the process units include more process units. The order of the process units may be changed as appropriate as long as the process does not depart from the gist thereof.

Although the embodiment describes the document determination method that is implemented by executing the second control program PGM2 by the second processor 21A included in the printer 2, the second control program PGM2 that is executed by the second processor 21A to implement the document determination method can be configured in the form of a computer-readable print medium having the second control program PGM2 recorded therein or can be configured in the form of a transmission medium for transmitting the second control program PGM2.

As the above-described print medium, a magnetic print medium, an optical print medium, or a semiconductor memory device can be used. The print medium may be a flexible disk, an HDD, a compact disc read-only memory (CD-ROM), a digital versatile disc (DVD), a Blu-ray (registered trademark) disc, a magneto-optical disc, a flash memory, a portable card type print medium, or a fixed print medium. The above-described print medium may be a nonvolatile storage device that is an internal storage device included in the printer 2 and is a RAM, a ROM, an HDD, or the like.

The functions of the second controller 21 of the printer 2 may be implemented by one or a plurality of processors or a semiconductor chip. The second controller 21 may include a co-processor such as a system on a chip (SoC), a micro control unit (MCU), or a field-programmable gate array (FPGA). The second controller 21 may cause the CPU and the co-processor to collaborate with each other to perform the various types of control or may selectively use one of the CPU and the co-processor to perform the various types of control.

The process units of the flowchart of FIG. 9 are obtained by dividing the process of the second controller 21 according to the main process contents to easily understand the process of the second controller 21 and are not limited by the names of the process units and by how the process is divided into the process units. The process units of the flowchart may be divided into a larger number of process units. The process units may be divided such that one or more of the process units include more process units. The order of the process units may be changed as appropriate as long as the process does not depart from the gist thereof.

Each of the functional units illustrated in FIGS. 1 and 2 represents a functional configuration, and specific implementation forms are not particularly limited. It may not be necessary to implement hardware individually corresponding to each of the functional units. One processor may execute a program to implement functions of two or more of the functional units. In the above-described embodiment, some of the functions implemented by the software may be hardware, or some of the functions implemented by the hardware may be software. Detailed configurations of the other units of the server device 1 and the printer 2 can be arbitrarily changed without departing from the gist thereof.

What is claimed is:

1. A document determination system comprising:
    an information processing device that stores identification information in association with document information;
    a printing device that prints a document image corresponding to the document information and a code image indicating the identification information on a print medium to generate a normal printed matter; and
    a reading device that reads a print image printed on a printed matter, wherein
    the printing device prints the code image in a preset end region of the print medium, and
    the information processing device determines whether the printed matter is the normal printed matter or a copied printed matter obtained by copying the normal printed matter, based on the code image included in the print image read by the reading device, and
    a part of the code image disappears in the copied printed matter.

2. The document determination system according to claim 1, wherein
    the code image is constituted by a first code image and a second code image different from the first code image, and
    the print medium has first and second end regions arranged opposite in a vertical direction or a horizontal direction and the printing device prints the first code image in the first end region and prints the second code image in the second end region arranged opposite to the first end region.

3. The document determination system according to claim 2, wherein
    the code image is a rectangular image, a direction of a longer side of the code image extends along an edge of the print medium, and a size of the code image in a direction of a shorter side of the code image is larger than a deviation of the print medium during printing and is smaller than a size of the first and second end regions in a direction of shorter sides of the first and second end regions.

4. The document determination system according to claim 2, wherein
    the information processing device determines whether the printed matter is the normal printed matter based on the first code image and the second code image that are included in the print image read by the reading device.

5. The document determination system according to claim 1, wherein
    the printing device uses a frameless printing function to print the code image in the end region.

6. The document determination system according to claim 1, wherein
    the reading device reads the entire print image of the print medium on a surface that is included in the print medium constituting the printed matter and on which the print image is already formed.

7. The document determination system according to claim 1, wherein
    a copying device that generates the copied printed matter reads an image of a region present on the normal printed matter and excluding the end region and prints the read image on the print medium.

8. A printing device that acquires, from an information processing device, document information and a code image indicating identification information associated with the document information, and prints a document image corresponding to the document information and the code image on a print medium to generate a printed matter, wherein
    the printing device prints the code image in a preset end region of the print medium,
    the printed matter is a normal printed matter, and
    a part of the code image disappears in a copied printed matter obtained by copying the normal printed matter.

* * * * *